United States Patent [19]

Allen et al.

[11] 4,070,573

[45] Jan. 24, 1978

[54] WIDE ANGLE LASER SEEKER

[75] Inventors: Edwin M. Allen; William C. Fitzgerald; Marino S. Melsted, all of Ridgecrest, Calif.

[73] Assignee: The United States of America as represented by the Secretary of the Navy, Washington, D.C.

[21] Appl. No.: 736,276

[22] Filed: Oct. 21, 1976

[51] Int. Cl.² .................................................. G01J 1/20
[52] U.S. Cl. .................. 250/203 R; 250/216; 250/347; 350/55
[58] Field of Search ............... 250/203, 201, 204, 216, 250/347, 334, 353; 350/55, 201, 294

[56] References Cited

U.S. PATENT DOCUMENTS

| 3,872,308 | 3/1975 | Hopson et al. | 250/347 |
| 3,954,228 | 5/1976 | Davis | 250/203 R |
| 4,030,807 | 6/1977 | Briney | 350/55 |

*Primary Examiner*—David C. Nelms
*Attorney, Agent, or Firm*—R. S. Sciascia; Roy Miller; Thomas Hennen

[57] ABSTRACT

A wide angle radiant energy detection apparatus arranged as a catadioptric Cassegrainian telescope having a plane secondary mirror is disclosed which utilizes a correcting lens as a structural support for the secondary mirror to reduce losses caused by mirror support structure vignetting. Angular resolution at wide field angles is increased by lenses which reduce oblique spherical aberation, spherical aberation, and coma, and by the more uniform energy distribution across the image field caused by the lack of vignetting optical support structure.

10 Claims, 3 Drawing Figures

WIDE ANGLE LASER SEEKER

BACKGROUND OF THE INVENTION

1. Field of the Invention

The present invention relates to a wide angle radiant energy detection apparatus, and more particularly to such apparatus wherein the optical elements are arranged to minimize vignetting caused by optical element support structure.

2. Description of the Prior Art

Radiant energy detection systems, such as are utilized in heat seeking guided missiles, or in missiles designed to home on laser illuminated bodies generally operate to first detect a target, and then follow it to a point of impact. In so doing, the optical portion of the apparatus systematically explores or scans a predetermined spatial region, and examines energy collected therefrom to determine whether or not an object of interest is present. If such an object is detected, the scanning phase terminates and the system enters a tracking mode to guide the missile towards the object.

The bore sight axis of such a system is, in effect, projected into space and becomes the axis of a conical geometric figure, the apex of which lies within the detection system itself. The energy collected from within the conical spatial region is detected and converted into a varying electrical signal which is proportional to changes in the amount of radiant energy received.

Detection of a radiant energy emitting source during the scanning phase is customarily performed by mechanically driving the optical components to execute a cyclic scanning action which results in the exploratory examination of a conical spatial region greater in size than the instantaneous field of view of the optical system itself. The components so driven usually comprise the mirrors and lenses from or through which intercept energy is directed to a detector.

Upon detection of radiant energy indicating the presence of a radiant energy emitting source within the spatial region under examination, cyclic movement of the optical elements ceases and the system switches to the track mode of operation. Generally, the track mode incorporates means for feeding the target representative electrical signals to an error detector, and then to a servo mechanism which controls the missile trajectory in accordance with target movement. As long as seeker gimbal angles and tracking rate capacities are not exceeded, any evasive action by the target is ineffective to prevent impact.

In a system of this type, the instantaneous field of view of the optical unit affects primarily the scanning phase operation of the system. A relatively narrow field of view requires more scanning action to search for a target in a given area, and is a significant limitation on the system because more time is required for target acquisition. This limitation increases the vulnerability of the missile to destruction before accomplishment of target impact.

A second significant factor affecting target acquisition is the amount of radiant energy that the optical system can gather to focus on the detector. A limitation of previous systems has been the manner in which optical elements are supported. The structural members intercept a significant portion of the radiant energy entering the optical system, thereby reducing the amount available for target acquisition. These problems have been overcome by the present invention which utilizes a lens as a structural support to reduce the vignetting losses, and improve angular resolution at wide field angles.

SUMMARY OF THE INVENTION

The wide angle laser seeker of this invention comprises an annular first lens mounted on a primary optical barrel to support a secondary optical barrel which supports a secondary mirror. The primary optical barrel is mounted in the center of the primary mirror to position the annular first lens concentrically about the primary mirror optical axis. Since the annular first lens supports the secondary optical barrel and secondary mirror relative to the first optical barrel and primary mirror, no central support post for the secondary mirror is required.

In addition, a second lens is positioned within the primary optical barrel, and light reflected by the primary mirror through the annular first lens to the secondary mirror is reflected again through the second lens and onto a detector. The annular first lens and the second lens are each selected to correct spherical aberration and coma caused by the spherical primary mirror and by the protective dome which encases the seeker apparatus in a missile.

Elimination of the secondary mirror central support post greatly increases the uniformity of energy distribution across the detector surface, and the proper selection of curvature for the annular first lens and second lens increases angular resolution at wide field angles by reducing spherical aberration and coma.

A major advantage of the invention is a wider instantaneous field of view which is achieved without significant loss of angular resolution or a change in focal length. Key elements in the achievement are the annular first lens and the second lens which reduce coma and oblique spherical aberration.

The annular first lens also serves a structural function, thereby eliminating the secondary mirror central support post. This results in the additional advantage of increasing the instantaneous field of view with much less attendant "darkening" of the edges as compared with prior art models. This vignetting in prior art models is caused by energy blockage at the secondary mirror central support past.

An advantage of uniform transmission of radiant energy across the entire instantaneous field of view is that the seeker will be uniformly sensitive to an emitting source regardless of where it occurs in that field. This results in less repetitious scanning and faster area coverage during the scan phase.

A further advantage of this invention is that the construction of the optical element and support structures facilitate their molding from optical plastics. For example, the primary mirror and primary optical barrel can readily be adapted to high volume production by molding as may the annular first lens, second lens, secondary mirror, and secondary optical barrel. Molding these pieces from optical plastic would result in considerable savings in parts as well as assembly costs over prior methods. In addition, a lighter over all assembly would be achieved.

BRIEF DESCRIPTION OF THE DRAWINGS

Further advantages of the present invention will emerge from the description which follows of a possible embodiment of a wide angle laser seeker according to the invention, given with reference to the accompanying drawing figures, in which.

DESCRIPTION OF THE PREFERRED EMBODIMENT

Figure 1:
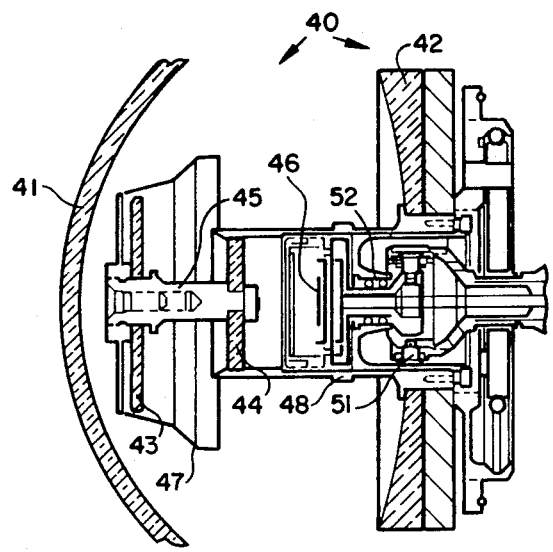
FIG. 1 shows a prior art laser seeker.

Referring now to the drawing figures wherein like reference numerals refer to like parts and elements throughout the several figures there is shown in FIG. 1 laser seeker 40 which illustrates the prior art. Seeker 40 is shown inclosed by dome 41 and has an optical system comprising primary mirror 42, plane secondary mirror 43, plane lens 44, and detector 46. Lens 44 is supported within optical barrel 48 which is centrally attached to primary mirror 42. Secondary mirror central support post 45 connects between lens 44 and plane secondary mirror 43 to provide mirror 43 with structural support. Hood 47 shields lens 44 against direct radiant energy from dome 41. As will be described later, radiant energy reaching seeker 40 from wide field angles will reflect from mirror 42 and 43 and be intercepted by support post 45, thereby darkening the field of view at wide field angles. Also, spherical aberration and coma introduced by dome 31 and mirror 42 is not corrected by plane mirror 43 and lens 44 and this results in reduced angular resolution.

Figure 2:
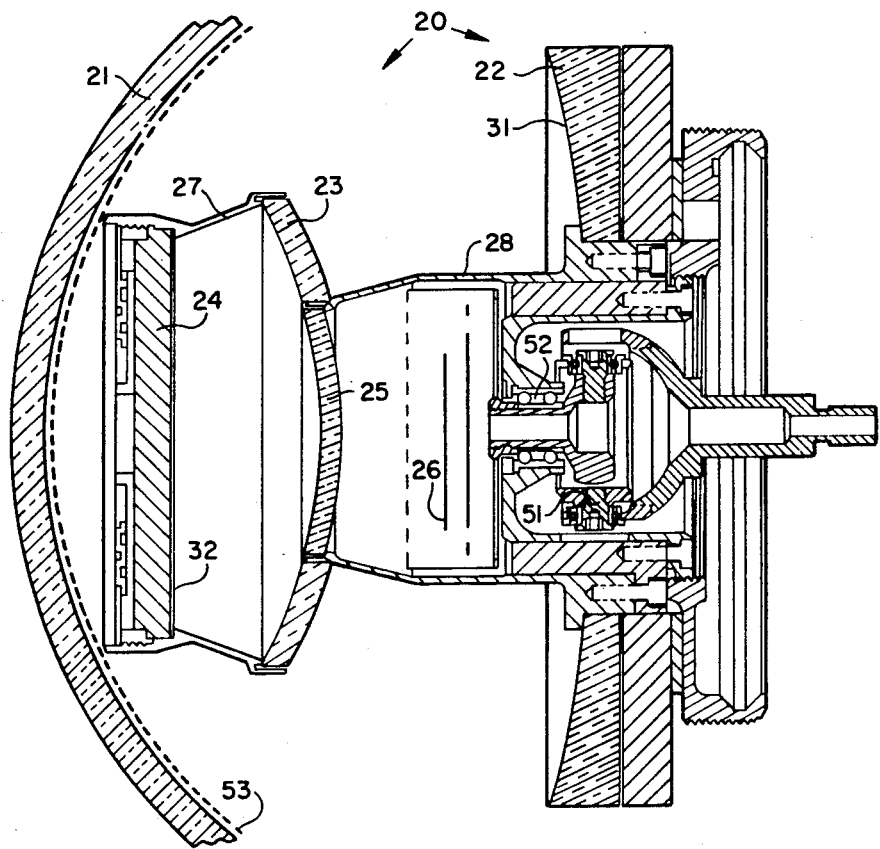
FIG. 2 shows a wide angle laser seeker according to the invention.

In FIG. 2 there is shown wide angle laser seeker 20 for use with a guided missile body (not shown). Dome 21 is selected to transmit radiant energy from a distant source in those frequencies which can be sensed by detector 26. Primary mirror 22 having concave reflective surface 31, is positioned to gather incoming radiant energy. Energy gathered by mirror 22 is reflected forward through annular first lens 23, and strikes reflective surface 32 of plane secondary mirror 24. Radiant energy thus reflected by mirror 24 passes through second lens 25 and strikes detector 26. Lenses 23 and 25 are supported by primary lens barrel 28 which is centrally mounted to primary mirror 22. Secondary mirror 24 is supported by secondary optical barrel 27 which mounts on the outer circumference of lens 23.

The optical system of seeker 20 comprising mirror 22, primary barrel 28, lenses 23 and 25, secondary optical barrel 27, and secondary mirror 24 all rotate on bearings 52 and thereby become the rotor of a gyroscope. This gyroscope is made to precess by electrical coils mounted in missile structure (not shown) in a well known manner. This precession is accommodated by gimbals 51 which allow seeker 20 to cyclically scan the interior of dome 21 within envelope 53. Dome 21, which is spherical, is also concentric with gimbals 51 so that radiant energy gathered by primary mirror 22 undergoes a constant amount of refraction by dome 21 regardless of the angular position of seeker 20.

Annular first lens 23 and second lens 25 have curvatures which are selected to correct spherical aberration and coma introduced by dome 21 and mirror 22. Dome 21 and primary mirror 22 may each have spherical curvatures, as may lenses 23 and 25.

Figure 3:
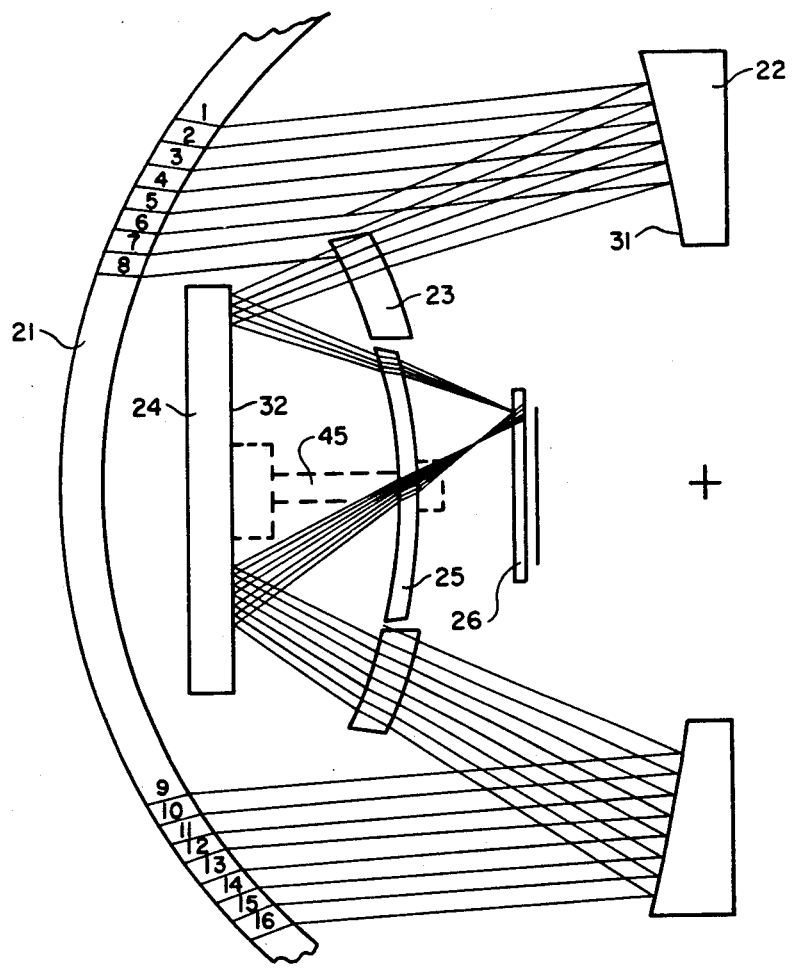
FIG. 3 shows the optical layout and ray trace of a wide angle laser seeker according to the invention.

In FIG. 3, the optical layout of seeker 20 is illustrated, and radiant energy rays 1, 2, 3, 4, 5, 6, 7, 8, 9, 10, 11, 12, 13, 14, 15, and 16 are shown. Rays 1 through 16 represent radiant energy received by seeker 20 from a point source at a wide field angle. From this ray trace it is seen that the secondary mirror central support post 45, which has been used in prior art seekers, intercepts rays 10 through 16 and thereby diminishes the amount of energy detected at a wide field angles. This phenomenon is termed support structure vignetting. Of course, not all incoming rays reach detector 26. Some rays, such as 1, 2 and 9, are intercepted by opaque seeker structural components. Elimination of secondary mirror central support post 45, however effectively increases the amount of radiant energy reaching detector 26 for objects which are observed at wide field angles.

Obviously, many modifications and variations of the present invention are possible in the light of the above teachings. It is therefore, to be understood that within the scope of the appended claims, the invention may be practiced otherwise than as specifically described.

We claim:
1. A wide angle radiant energy detection apparatus, comprising:
   an optical system having a primary mirror having an optical axis for gathering and reflecting radiant energy; a first lens defining an annular shape having an inner and outer circumference, positioned concentrically about said primary mirror optical axis for transmitting radiant energy reflected by said primary mirror; a secondary mirror positioned on said primary mirror optical axis for reflecting radiant energy transmitted by said first lens; a second lens positioned on said primary mirror optical axis for transmitting radiant energy reflected by said secondary mirror; and
   a detector responsive to radiant energy, positioned to receive radiant energy transmitted by said second lens.
2. The wide angle radiant energy detection apparatus of claim 1 wherein said optical system further comprises:
   a primary optical barrel having first and second ends and a central bore, said central bore being concentric about said primary mirror optical axis, said first end being attached to said primary mirror, said second end being attached to said first lens on said inner circumference of said first lens and said second lens being retained within said central bore; and
   a secondary optical barrel having a central cavity and an open end, said open end being attached to said outer circumference of said first lens, said secondary mirror being retained within said central cavity.
3. The wide angle radiant energy detection apparatus of claim 1 wherein said primary mirror has a concave spherical reflective surface.
4. The wide angle radiant energy detection apparatus of claim 1 wherein said first lens has a convex spherical surface and a concave spherical surface.
5. The wide angle radiant energy detection apparatus of claim 1 wherein said second lens has a concave spherical surface and a convex spherical surface.
6. The wide angle radiant energy detection apparatus of claim 1 wherein said secondary mirror has a plane reflecting surface.
7. The wide angle radiant energy detection apparatus of claim 2 wherein said first lens structurally supports said secondary optical barrel.
8. The wide angle radiant energy detection apparatus of claim 7 wherein said first and second lenses are made of optical plastic.
9. The wide angle radiant energy detection apparatus of claim 7 wherein said primary and secondary mirrors are made of optical plastic.
10. The wide angle radiant energy detection apparatus of claim 7 wherein said apparatus us mounted to structure and at least partially enclosed by a transparent dome.

* * * * *